United States Patent
Matsuzawa

(10) Patent No.: US 6,541,882 B2
(45) Date of Patent: Apr. 1, 2003

(54) POWER GENERATOR, TIMEPIECE AND ELECTRONIC DEVICE HAVING THE SAME, AND COGGING TORQUE ADJUSTMENT METHOD FOR THE SAME

(75) Inventor: Kinya Matsuzawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/754,970

(22) Filed: Jan. 5, 2001

(65) Prior Publication Data

US 2002/0047335 A1 Apr. 25, 2002

(30) Foreign Application Priority Data

Jan. 6, 2000 (JP) .................................... 2000-000925
Oct. 13, 2000 (JP) .................................... 2000-314283

(51) Int. Cl.[7] ............................................. H02K 37/00
(52) U.S. Cl. ........................ 310/49 R; 310/36; 368/160; 318/696
(58) Field of Search ................ 310/49 R, 15, 310/36; 368/202, 203, 204, 156, 160, 163, 162; 318/696, 138, 685

(56) References Cited

U.S. PATENT DOCUMENTS 4,326,278 A * 4/1982 Shida et al. ................ 638/157
4,382,691 A * 5/1983 Shida et al. ................ 368/157
6,163,126 A * 12/2000 Kojima et al. ............. 318/685

FOREIGN PATENT DOCUMENTS

| JP | 8-75873 | 3/1996 |
|---|---|---|
| JP | 09-203785 | 8/1997 |
| JP | 10-42532 | 2/1998 |
| JP | 11-160463 | 6/1999 |

* cited by examiner

Primary Examiner—Thanh Lam
(74) Attorney, Agent, or Firm—Mark P. Watson

(57) ABSTRACT

Inner notches (225A, 226A) for adjusting the cogging torque of a rotor (21) are formed on a stator (22) in a small-size power generator (20). Since the inner notches (225A, 226A) are formed on an inner periphery of a rotor accommodation hole (230) within an angular range of ±45° around a magnetic flux direction of a first magnetic circuit (100) having a smaller magnetic reluctance at a rotation center of the rotor (21), the cogging torque can be effectively reduced. Accordingly, even when the size of components such as an oscillating weight and a power spring is reduced for making a thin timepiece, rotation startability of the rotor can be improved, thus improving power generation efficiency of the small-size power generator.

10 Claims, 14 Drawing Sheets

POWER GENERATOR, TIMEPIECE AND ELECTRONIC DEVICE HAVING THE SAME, AND COGGING TORQUE ADJUSTMENT METHOD FOR THE SAME

BACKGROUND OF THE INVENTION

1. Field of the Invention

The present invention relates to a power generator, a timepiece and electronic device having the power generator and a cogging torque adjustment method for the power generator, the power generator being adapted for supplying power in an electronic clock etc. More specifically, it relates to a technique for optimizing a cogging torque (non-excitation torque/detent torque of a step motor) of a power generator.

2. Description of the Related Art

As shown in FIG. 1, an electronic clock with a crystal oscillator as a time standard has a power supply 10 having a small-size power generator 20 and a secondary power supply 30. The power supply 10 actuates a step motor etc. of a processor 14. As shown in FIG. 2, the small-size power generator 20 is provided with a rotor 21 to be rotated by a transmitted rotary drive force, a stator 22 sandwiching the rotor 21 and a power-generating coil 23 wound around a magnetic core constituting a magnetic circuit together with the stator 22 and the rotor 21. The rotor 21 has a power-generating gear train 60 for speeding up and transmitting a rotation of an oscillating weight 25.

In order for the rotor 21 to remain at a desired position when no load is applied, outer notches 221 and 222 for the magnetic saturation portion on a periphery of the rotor 21 are formed on the stator 22 as shown in FIG. 14. The rotor 21 is a permanent magnet having N and S magnetic poles. When the rotor 21 remains at a certain angular position and the rotation of the oscillating weight 25 is transmitted through the power-generating gear train 60, the magnetic poles N and S are rotated to generate electromotive force to the power-generating coil 23. Since a cogging torque is applied to the rotor 21, the rotor 21 is biased to remain at a predetermined angular position (rotor stop position without applying load-referred to "no-load rotor stop position" hereinafter.).

Accordingly, in order to rotate rotor 21 the oscillating weight 25 has to be capable of transmitting greater torque to the rotor 21 than the cogging torque.

However, the size and thickness of respective components of an electronic clock have been reduced to minimize its overall thickness. Thus, the size and weight of the oscillating weight 25 of the small-size power generator 20 are necessarily reduced. Accordingly, with the conventional small-size power generator 20, when the size and weight of the oscillating weight 25 are reduced while the magnitude of the cogging torque applied to the rotor 21 does not change, rotation of the oscillating weight 25 can be hampered, thus rendering it incapable of charging the secondary power supply 30.

In another type of power generator, the rotor of the power generator is rotated by a mechanical energy source such as a power spring. However, when the size of the power spring etc. is reduced, the rotation of the rotor can be hampered, thus causing the same problem in charging the secondary power supply.

Accordingly, it has been desired that the magnitude of cogging torque is made as small as possible so as to facilitate rotation of the rotor even when the size of the oscillating weight 25 and the power spring etc. is reduced.

SUMMARY OF THE INVENTION

An object of the present invention is to provide a power generator capable of efficiently reducing the cogging torque applied to the rotor and thus capable of efficiently generating electric power by improving rotation startability of the rotor, a timepiece and electronics having the power generator and a cogging torque adjustment method of power generator.

A power generator according to the present invention includes: a rotor having a permanent magnet rotated by a transmitted rotary drive force; a stator having a rotor accommodation hole for the rotor to be disposed; and a power-generating coil wound around a magnetic core constituting a magnetic circuit along with the stator and the rotor, where magnetic reluctances of a first magnetic circuit extending from the rotor through the stator and the magnetic core back to the rotor and a second magnetic circuit with magnetic flux thereof closing around a stator adjacent the rotor are compared without forming an inner notch on an inner periphery of the rotor accommodation hole, where, when the magnetic reluctance of the first magnetic circuit is smaller, the inner notch is formed on the inner periphery of the rotor accommodation hole of the stator within angular range of ±45° around a magnetic flux direction of the first magnetic circuit at a rotation center of the rotor, and where, when the magnetic reluctance of the second magnetic circuit is smaller, the inner notch is formed on the inner periphery of the rotor accommodation hole of the stator within angular range of ±45° around a magnetic flux direction of the second magnetic circuit at a rotation center of the rotor.

In the present invention, the inner notch is not restricted to a cut portion formed on the inner periphery of the rotor accommodation hole, but may be a dent (reduced thickness of a part of the stator) on the inner periphery of the rotor accommodation hole or alternatively may be a hole (a through-hole penetrating the stator in thickness direction) formed adjacent to the inner periphery of the rotor accommodation hole. In other words, any arrangement is possible for the inner notch as long as the inner notch can enlarge a part of the gap between the rotor and the inner periphery of the rotor accommodation hole or the through-hole is provided to the magnetic circuit to adjust the magnetic reluctance of the magnetic circuit.

When the stator is, for instance, divided at the rotor accommodation hole section, the first magnetic circuit starts from the rotor (magnet), passes through one of the stators and the magnetic core to the other stator and returns back to the rotor. Similarly, when the stator is integrally formed without being divided, the first magnetic circuit starts from the rotor, passes through the stator on one side of the rotor and the magnetic core to the other side of the stator and returns back to the rotor.

The magnetic flux direction of the second magnetic circuit at the rotation center of the rotor (referred to the second magnetic circuit direction hereinafter) is a direction for the second magnetic circuit with magnetic flux thereof closing at the stator around the rotor, which is ordinarily a direction orthogonal to the magnetic flux direction of the first magnetic circuit at the rotation center of the rotor (referred to the first magnetic circuit direction hereinafter).

The cogging torques by the main first magnetic circuit and the second magnetic circuit with its magnetic flux closing around the rotor are applied to the rotor. Since the respective magnet circuits ordinarily cross perpendicularly at the rotor section, the magnetic circuit that applies a strong magnetic attraction force due to high magnetic flux density, i.e. the magnetic circuit with smaller magnetic reluctance, exerts a large influence. Accordingly, by forming the inner notch in the magnetic circuit having the smaller magnetic reluctance to enlarge the gap between the rotor and the stator to increase magnetic reluctance, the magnetic attraction force applied to the rotor, i.e. the cogging torque can be reduced. Therefore, even when the size and weight of the oscillating weight or the power spring are reduced by reducing the thickness of devices, power can be efficiently generated and the secondary power supply can be efficiently charged. Further, since the actuation torque of the rotor can be reduced when a power spring is used, duration of the power spring can be lengthened with the power spring of the same size, so that the power generator can be worked for a longer time.

Incidentally, when the inner notch is arranged beyond ±45° disposition relative to either the first or the second magnetic circuit direction having the smaller magnetic reluctance, the magnetic reluctance of either the first or the second magnetic circuit direction having smaller magnetic reluctance cannot be enhanced by the inner notch, so that the cogging torque cannot be reduced. Accordingly, the inner notch has to be formed at least within an angular range of ±45° around the magnetic circuit direction having smaller magnetic reluctance.

In another aspect of the present invention, a power generator includes: a rotor having a permanent magnet rotated by a transmitted rotary drive force; a stator having a rotor accommodation hole for the rotor to be disposed; and a power-generating coil wound around a magnetic core constituting a magnetic circuit along with the stator and the rotor, where a magnetic reluctance of a first magnetic circuit extending from the rotor through the stator and the magnetic core back to the rotor is set smaller than a second magnetic circuit with magnetic flux thereof closing around a stator adjacent to the rotor when an inner notch is not formed on an inner periphery of the rotor accommodation hole of the stator, and where the inner notch is formed on the inner periphery of the rotor accommodation hole of the stator within angular range of ±45° around a magnetic flux direction of the first magnetic circuit at a rotation center of the rotor.

In still another aspect of the present invention, a power generator includes: a rotor having a permanent magnet rotated by a transmitted rotary drive force; a stator having a rotor accommodation hole for the rotor to be disposed; and a power-generating coil wound around a magnetic core constituting a magnetic circuit along with the stator and the rotor, where a magnetic reluctance of a second magnetic circuit with magnetic flux thereof closing around a stator adjacent to the rotor is set smaller than a first magnetic circuit extending from the rotor through the stator and the magnetic core back to the rotor when an inner notch is not formed on an inner periphery of the rotor accommodation hole of the stator, and where the inner notch is formed on the inner periphery of the rotor accommodation hole of the stator within angular range of ±45° around a magnetic flux direction of the second magnetic circuit at a rotation center of the rotor.

According to the above power generator, the cogging torque applied to the rotor can be efficiently reduced by forming the inner notch on the magnetic path of the magnetic circuit having the smaller magnetic reluctance among the two magnetic circuits, so that power can be efficiently generated and the secondary power supply can be efficiently charged even when the size and weight of the oscillating weight or the power spring are reduced by reducing the thickness of devices.

In the above arrangement, the inner notch may preferably be formed within an angular range of ±10° around the magnetic flux direction of either the first magnetic circuit or the second magnetic circuit at the rotation center of the rotor. Accordingly, the cogging torque can be further efficiently reduced as compared to wider angular range arrangement.

Further, the inner notch may preferably be formed in the magnetic flux direction of either the first magnetic circuit or the second magnetic circuit at the rotation center of the rotor. Accordingly, the cogging torque can be reduced with the highest efficiency. Further, by efficiently reducing the cogging torque, the size of the inner notch can be reduced.

In a further aspect of the present invention, a power generator includes: a rotor having a permanent magnet rotated by a transmitted rotary drive force; a stator having a rotor accommodation hole for the rotor to be disposed; and a power-generating coil wound around a magnetic core constituting a magnetic circuit along with the stator and the rotor, where magnetic reluctances of a first magnetic circuit extending from the rotor through the stator and the magnetic core back to the rotor and a second magnetic circuit with magnetic flux thereof closing around a stator adjacent the rotor are compared without forming an protrusion on an inner periphery of the rotor accommodation hole, where, when the magnetic reluctance of the first magnetic circuit is greater, the protrusion projecting toward the rotor is formed on the inner periphery of a rotor accommodation hole of the stator within angular range of ±45° around a magnetic flux direction of the first magnetic circuit at a rotation center of the rotor, and where, when the magnetic reluctance of the second magnetic circuit is greater, the protrusion projecting toward the rotor is formed on the inner periphery of the rotor accommodation hole of the stator within angular range of ±45° around a magnetic flux direction of the second magnetic circuit at a rotation center of the rotor.

In the present invention, any protrusion can be used as long as the gap between the rotor and the inner periphery of the rotor accommodation hole can be partially reduced, thus adjusting the magnetic reluctance of the magnetic circuit.

The cogging torques by the main first magnetic circuit and the second magnetic circuit with its magnetic flux closing around the rotor are applied to the rotor. Since the respective magnet circuits ordinarily cross perpendicularly at the rotor section, a balance of the magnetic flux density, i.e. a balance between the magnetic reluctance of the respective magnetic circuits exerts great influence. Accordingly, by forming the protrusion in the magnetic circuit having greater magnetic reluctance to reduce the gap between the rotor and the stator to decrease its magnetic reluctance, the magnetic attraction force applied to the rotor, i.e. the cogging torque can be reduced in total. Therefore, even when the size and weight of the oscillating weight or the power spring are reduced by reducing the thickness of devices, power can be efficiently generated and the secondary power supply can be efficiently charged. Further, since the actuation torque of the rotor can be reduced when a power spring is used, duration of the power spring can be lengthened with the power spring of the same size, so that the power generator can be worked for a longer time.

Incidentally, the arrangement of the protrusion may preferably be within an angular range of ±45° around the magnetic flux direction of either the first magnetic circuit or the second magnetic circuit having the greater magnetic reluctance at the rotation center of the rotor as in the inner notch. Considering cogging torque reduction effect, the angular range may preferably be within ±10° and the effect can be maximized by forming the protrusion in the magnetic flux direction.

The power generator may preferably further include an oscillating weight for rotating together with body motion of a user; and a power-generating gear train for rotating the rotor by transmitting a rotation of the oscillating weight to the rotor.

Though the rotary drive force for rotating the rotor may be supplied from mechanical energy source such as power spring, rubber, spring and eccentric weight, an oscillating weight rotating together with body motion of a user may preferably be used, since the rotor can be conveniently rotated by simply attaching the power generator to a moving body (e.g. a person's wrist).

A timepiece according to the present invention has the above power generator and a processor for actuating a time display by an electric energy generated by the power generator.

The timepiece having the power generator can efficiently reduce the cogging torque applied to the rotor, so that the power can be efficiently generated and the secondary power supply can be efficiently charged even when the size and weight of the oscillating weight and the power spring are reduced on account of thickness reduction of a device, thus capable of being applied to a small-size timepiece such as a wristwatch.

An electronic device according to the present invention has the above power generator and a processor actuated by an electric energy generated by the power generator. Such electronic device includes a cellular phone, PHS (personal handyphone system), automobile and house key (including a processor for light and keyless entry), radio, personal computer, calculator, IC card etc. The present invention can be suitably applied to any small-size portable electronic device.

A cogging torque adjustment method according to the present invention is for a power generator including a rotor having a permanent magnet rotated by a transmitted rotary drive force, a stator having a rotor accommodation hole for the rotor to be disposed, and a power-generating coil wound around a magnetic core constituting a magnetic circuit along with the stator and the rotor. The method has the steps of: comparing magnetic reluctances of a first magnetic circuit extending from the rotor through the stator and the magnetic core back to the rotor and a second magnetic circuit with magnetic flux thereof closing around a stator adjacent the rotor without forming an inner notch on an inner periphery of the rotor accommodation hole; forming the inner notch on the inner periphery of the rotor accommodation hole of the stator within angular range of ±45° around a magnetic flux direction of the first magnetic circuit at a rotation center of the rotor when the magnetic reluctance of the first magnetic circuit is smaller; and forming the inner notch on the inner periphery of the rotor accommodation hole of the stator within angular range of ±45° around a magnetic flux direction of the second magnetic circuit at a rotation center of the rotor when the magnetic reluctance of the second magnetic circuit is smaller.

Another cogging torque adjustment method according to the present invention is for a power generator including a rotor having a permanent magnet rotated by a transmitted rotary drive force, a stator having a rotor accommodation hole for the rotor to be disposed, and a power-generating coil wound around a magnetic core constituting a magnetic circuit along with the stator and the rotor, the method comprising the steps of: comparing magnetic reluctances of a first magnetic circuit extending from the rotor through the stator and the magnetic core back to the rotor and a second magnetic circuit with magnetic flux thereof closing around a stator adjacent the rotor without forming an protrusion on an inner periphery of the rotor accommodation hole; forming the protrusion projecting toward the rotor on the inner periphery of a rotor accommodation hole of the stator within angular range of ±45° around a magnetic flux direction of the first magnetic circuit at a rotation center of the rotor when the magnetic reluctance of the first magnetic circuit is greater; and forming the protrusion projecting toward the rotor on the inner periphery of the rotor accommodation hole of the stator within angular range of ±45° around a magnetic flux direction of the second magnetic circuit at a rotation center of the rotor when the magnetic reluctance of the second magnetic circuit is greater.

In the above cogging torque adjustment method of the power generator, arrangement of the rotor and the stator has been described thus far, and arrangement of the inner notch and the protrusion has also been described.

The cogging torque can be efficiently reduced according to the cogging torque adjustment method of the present invention.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DETAILED DESCRIPTION

An embodiment of the present invention will be described below with reference to the drawings.

Figure 1:
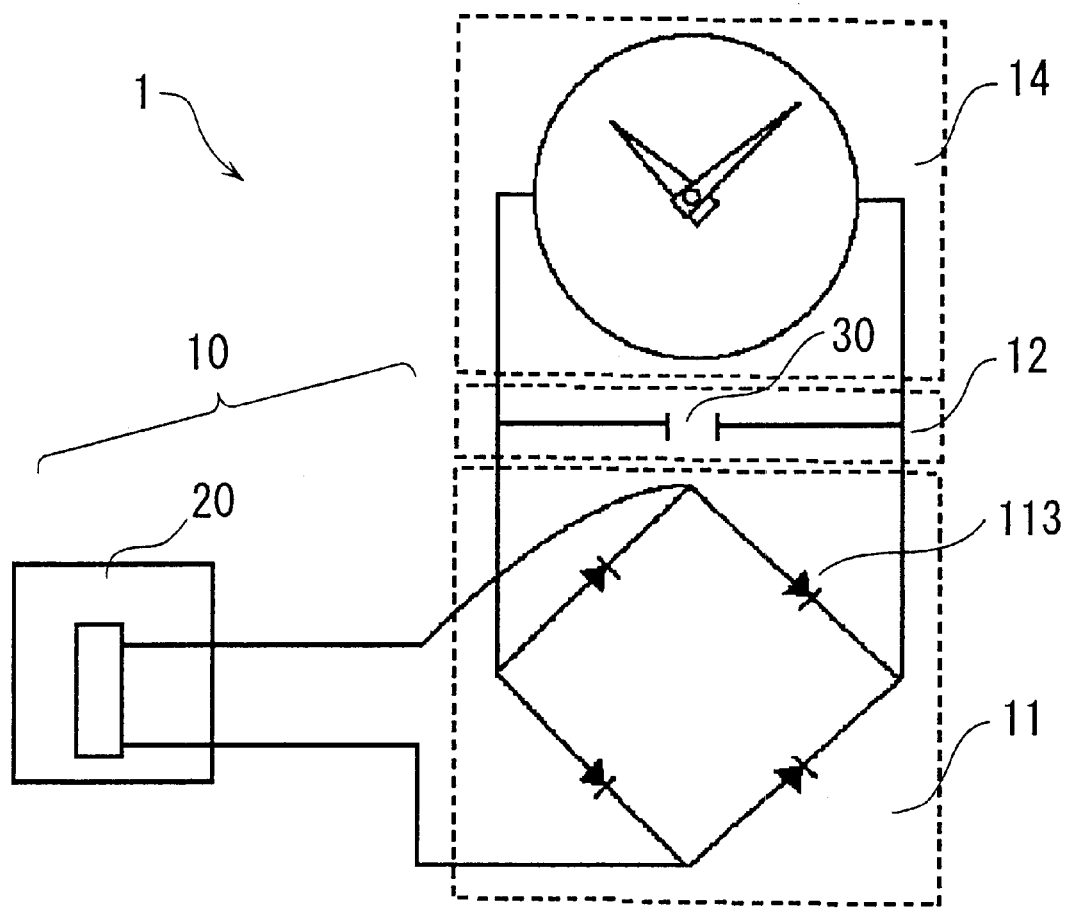
FIG. 1 is a general block diagram showing an entire structure of a timepiece having a power generator embodying the present invention in a power supply.

FIG. 1 shows a general arrangement of an electronic device having a power generator embodying the present invention.

A timepiece 1 according to the present invention has a power supply 10 composed of a small-size power generator 20, a rectifier 11 for rectifying alternating current output from the power generator 20, and a storage circuit 12 for storing electric current rectified by the rectifier 11. Further, the timepiece 1 has a processor 14 for clocking and displaying time by electric energy obtained by the power generator 20.

In addition to the clocking and time-displaying function, the processor 14 may have functions such as radio, pager and personal computer. Though a capacitor is used for the storage circuit 12, any secondary power supply 30 having power storage capability such as secondary battery may be used. The rectifier 11 is not restricted to a full-wave rectifier using a diode 113 but may be a half-wave rectifier, or alternatively, may be a rectifier using an inverter etc.

In the following description, a portable timepiece (wristwatch) having an index electronic clock as a processor 14 is taken as an example. Incidentally, in describing the respective components of the power generator 20, portions having the function common to the conventional power generator will be referred to with the same reference numerals.

Figure 2:
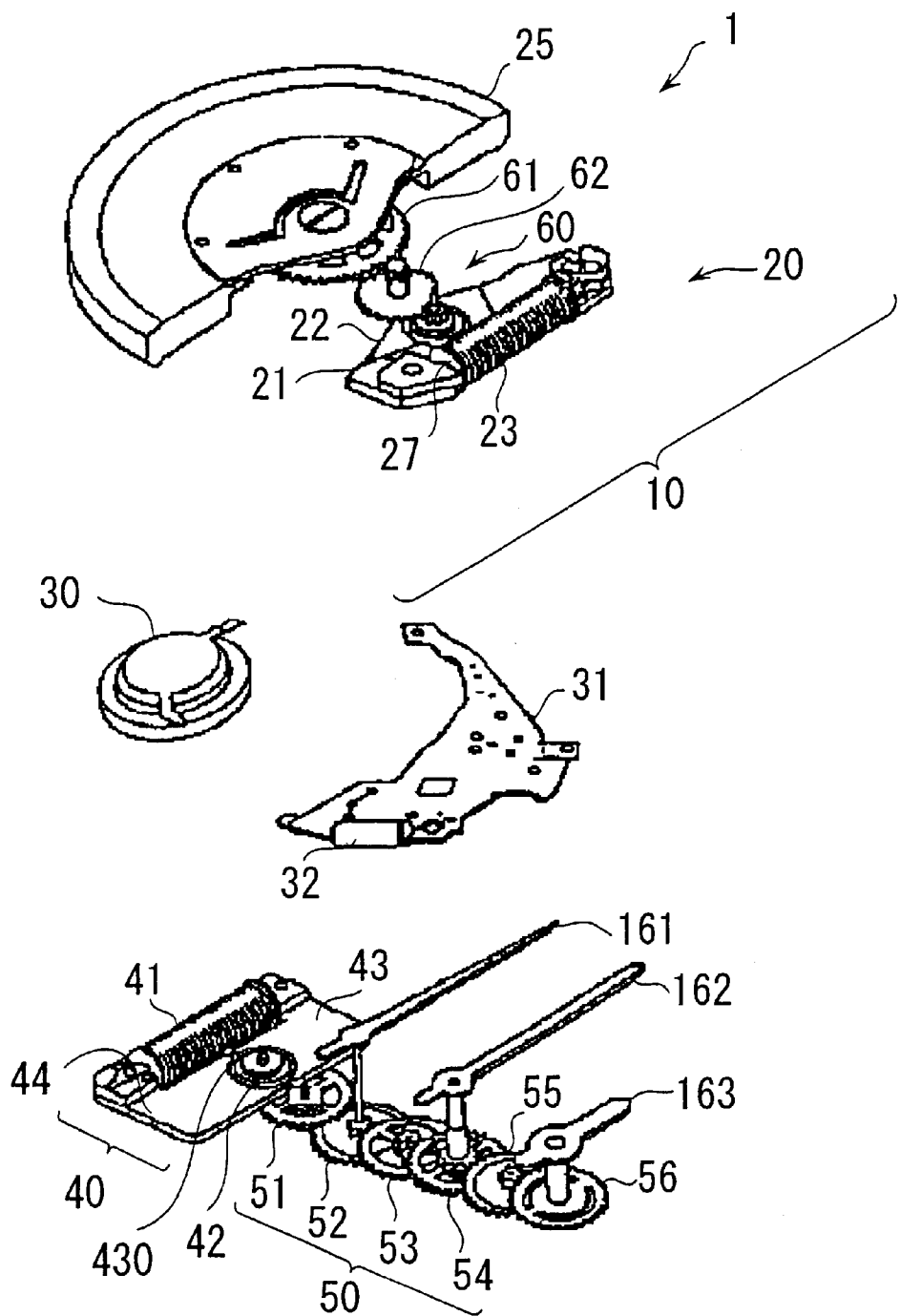
FIG. 2 is an overall perspective view showing an entire structure of an index electronic clock as an example of the timepiece.

In FIG. 2, the electronic clock of the timepiece 1 of the present invention is an index-displaying analog crystal wristwatch, where a step motor 40 is driven based on a signal transmitted from a crystal oscillator 32 on a circuit board 31. The step motor 40 is composed of a motor rotor 42 made of a permanent magnet magnetized in two poles, a motor stator 43 having a cylindrical rotor accommodation hole 430 for the motor rotor 42 to be disposed, and a coil block made of a magnetic core 44 with a coil 41 wound around the magnetic core.

A clock gear train 50 composed of a fifth gear and pinion 51, a sweep gear and pinion 52, a third gear and pinion 53, a center gear and pinion 54, a minute gear 55 and an hour gear 56 is connected to the motor rotor 42 through a pinion. A second hand 161 is secured to an end of a shaft of the sweep gear and pinion 52. A minute hand 162 is fixed to a cylindrical shaft of the center gear and pinion 54. An hour hand 163 is fixed to an end of a cylindrical shaft of the hour gear 56. Reduction ratio from the motor rotor 42 to the sweep gear and pinion 52 is 1/30. The second hand 161 intermittently rotates by 6° in accordance with intermittent rotation of the motor rotor 42 by 180° for every one second.

The power supply 10 for driving the step motor 40 consists primarily of the small-size power generator 20 and the secondary power supply (capacitor) 30. The small-size power generator 20 has an eccentric oscillating weight 25 rotated by a movement of the arm of the person wearing the timepiece, for example, a rotor 21 rotated by receiving kinetic energy from the oscillating weight 25, a stator 22 sandwiching the rotor 21, and a power-generating coil 23 wound around a magnetic core 27, the magnetic core 27 constituting a magnetic circuit along with the stator 22 and the rotor 21. The oscillating weight 25 and the rotor 21 are mechanically connected by a power-generating gear train 60 for speeding up and transmitting rotation of the oscillating weight 25, the power-generating gear train 60 being composed of a gear wheel 61 formed integrally with the oscillating weight 25 and a transmission gear 62 having a pinion meshing with the gear wheel 61.

Figure 3:
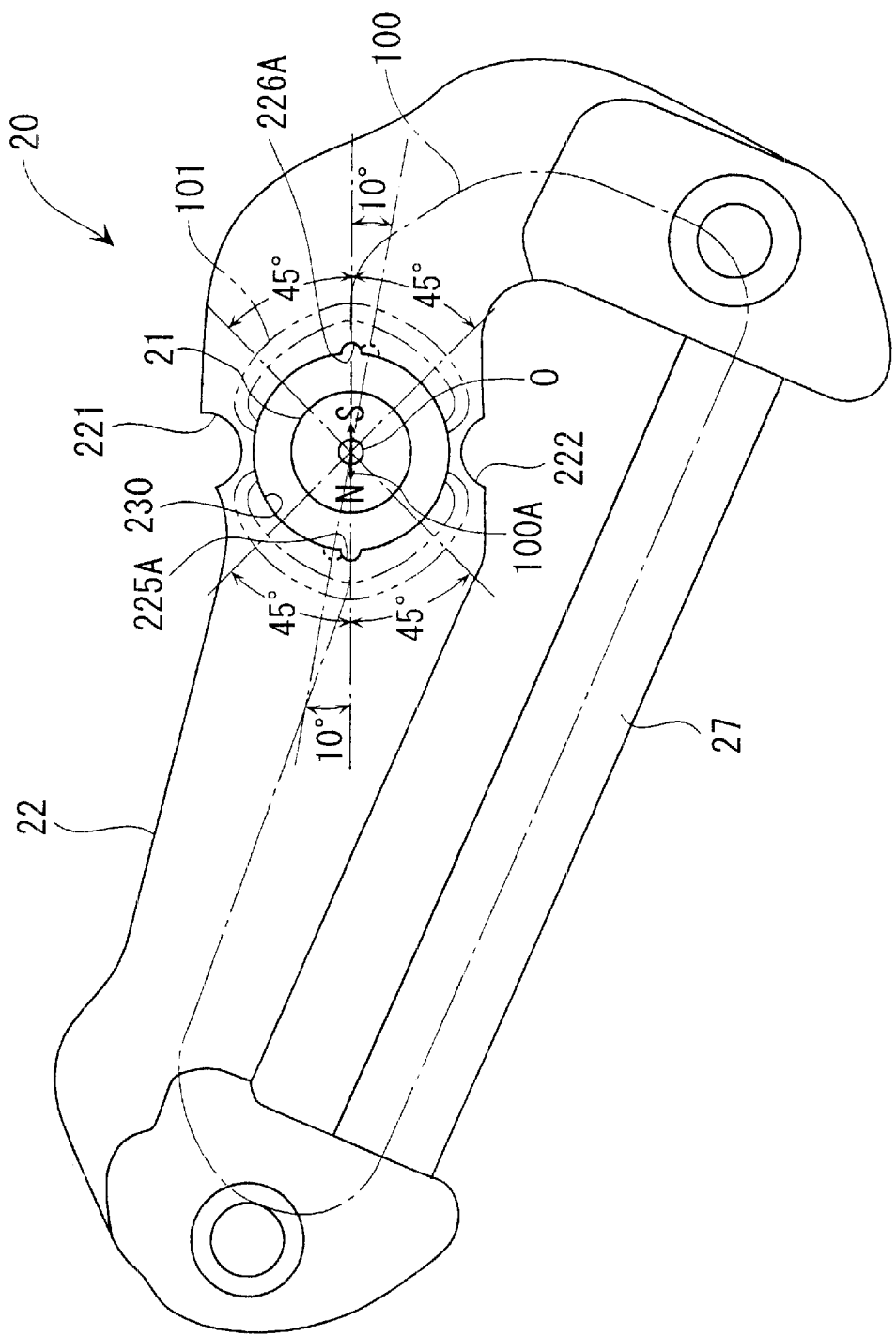
FIG. 3 is a plan view showing a primary portion of the power generator according to a first embodiment of the present invention.

As shown in FIG. 3, a rotor accommodation hole 230 for disposing the rotor 21 is provided in the stator 22. A first magnetic circuit (main magnetic circuit) 100 passing through the stator 22 and the magnetic core 27 is formed in a loop-shape through the rotor 21. In other words, the first magnetic circuit 100 starts from, for example, the rotor 21, passes through one side of the stator 22, the magnetic core 27 and the other side of the stator 22, and returns back to the rotor 21.

Outer notches 221 and 222 for forming a pair of magnetic saturation portions on a periphery of the rotor 21 are formed on two sides of the stator 22 located orthogonally with the first magnetic circuit 100 relative to a rotation center O.

The rotor 21 is a cylindrical permanent magnet having two magnetic poles N and S for equally dividing a circumference of the rotor 21. When the magnetic poles N and S rotate when the rotation of the oscillating weight 25 is transmitted, induced electromotive force can be obtained from the power-generating coil 23, thereby charging the secondary power supply 30.

Since cogging torque is applied to the rotor 21 by the first magnetic circuit 100 and a second magnetic circuit 101 whose magnetic flux closes at the stator 22 adjacent to the rotor 21, the rotor 21 is biased to remain at a certain angular position (no-load rotor stop position).

Incidentally, the rotor 21 is rotated by a torque from the oscillating weight 25 rotating in accordance with arm movement. However, the size and weight of the oscillating weight 25 has come to be reduced in accordance with thickness reduction of the index electronic clock 1. Accordingly, when the size and weight of the oscillating weight 25 are reduced in the conventional small-size power generator, rotation startability of the rotor 21 can be lowered, since the torque from the oscillating weight 25 decreases while the cogging torque applied to the rotor 21 remains constant.

Accordingly, in the present embodiment, inner notches 225A and 226A are provided in the stator 22 for adjusting the cogging torque as illustrated in FIG. 3, thus reducing cogging torque and improving efficiency of the power generator.

In the present embodiment, material, area and gap dimension of the connecting portion of the respective stator 22 and the magnetic core 27 are arranged so that, when the inner notches 225A and 226A are not formed, the magnetic reluctance of the second magnetic circuit 101 (extending from the rotor 21 and the stator 22 shown in double dotted line in FIG. 3 adjacent to the rotor 21 and closing at the section of the stator 22) is greater than magnetic reluctance of the first magnetic circuit 100 (extending from the rotor 21 through the stator 22 shown in single dotted line in FIG. 3, the magnetic core 27 and the stator 22 back to the rotor 21).

Incidentally, the size of the respective magnetic circuits 100 and 101 can be adjusted especially by the presence and size of the gap of the connecting portion of the stator 22 and the magnetic core 27.

Further, the material of the rotor 21, the stator 22 and the magnetic core 27 can be appropriately selected. For instance, various permanent magnets such as samarium-cobalt sintered magnet can be used for the stator 21 and permalloy (PB and PC materials) can be used for the stator 22 and the magnetic core 27.

In the present embodiment, the magnetic poles N and S of the permanent magnet of the rotor 21 is applied with the cogging torque in a direction for resting the magnetic poles N and S in the first magnetic circuit direction (shown by an arrow 100A in FIG. 3), i.e. for attracting the magnetic poles N and S in a direction orthogonal to a direction connecting the outer notches 221 and 222. The position in which the rotor 21 rests by the cogging torque is the no-load rotor stop position.

In the present embodiment, in order to reduce the cogging torque, inner notches 225A and 226A for adjusting cogging torque are dented on an inner periphery of the rotor accommodation hole 230. Specifically, the inner notches 225A and 226A are arranged so that a direction extending from the rotation center of the rotor 21 to the inner notches 225A and 226A is within angular range of ±45° around the arrowed 100A direction (the first magnetic circuit direction), more specifically, precisely in the first magnetic circuit direction. Incidentally, a variation within the angular range of approximately ±5° can be caused on account of production error etc.

The inner notches 225A and 226A may be dented trapezoidally or triangularly and any configuration is possible. In the present embodiment, the notches 225A and 226A are dented in a semi-spherical shape on the inner periphery of the rotor accommodation hole 230.

Incidentally, reduction ratio of the cogging torque applied to the rotor 21 can be adjusted by position, size and configuration of the cogging-torque-adjusting inner notches 225A and 226A.

Figure 4A:
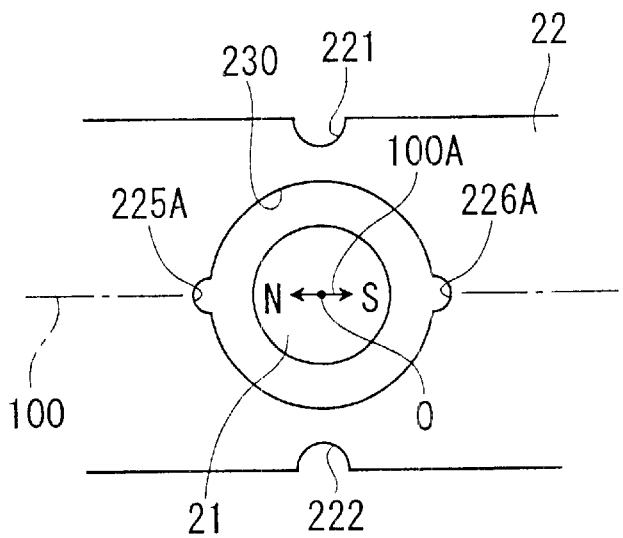
FIGS. 4A to 4C are illustrations showing an example of arrangement of inner notch of the power generator shown in FIG. 3.
Figure 4B:
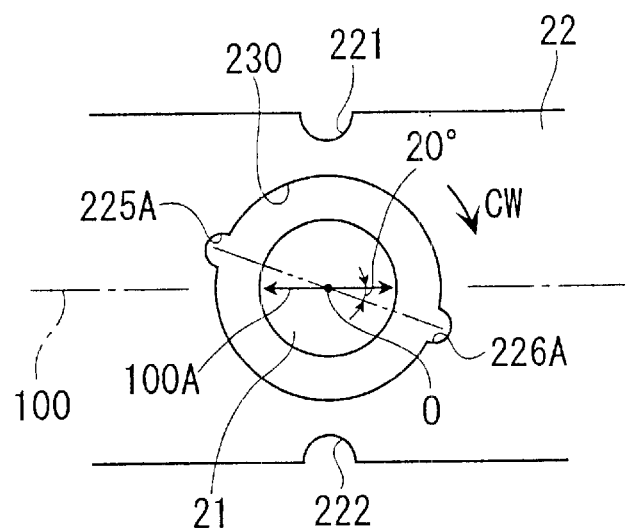

Accordingly, though the respective inner notches 225A and 226A are preferably formed along the first magnetic circuit direction 100A as shown in FIG. 3 and 4A in an ordinary case, the first cogging-torque-adjusting inner notch 225A may be shifted clockwise (in CW direction) relative to the first magnetic circuit direction 100A by a predetermined angle (e.g. 20°), and the second cogging-torque-adjusting inner notch 226A may be formed at a position shifted from the first inner notch 225A by 180°, as shown in FIG. 4B.

Figure 4C:
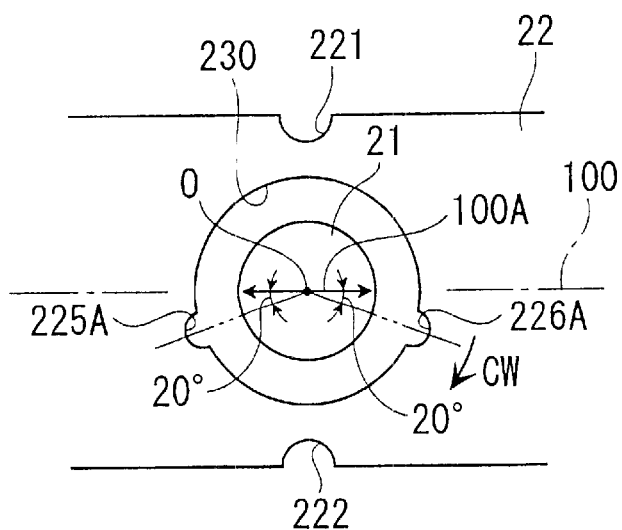

Alternatively, as shown in FIG. 4C, the second inner notch 226A for adjusting cogging torque may be shifted clockwise relative to the first magnetic circuit direction 100A by a predetermined angle (e.g. 20°), and the first inner notch 225A for adjusting cogging torque may be formed at a position shifted clockwise from the second inner notch 226A by 140°.

In other words, the inner notches 225A and 226A may be formed within an angular range of ±45° around the rotation center O of the rotor 21 relative to the first magnetic circuit direction 100A. For instance, the angle may be set as ±45°, ±30°, ±20°, ±10°, ±0° etc. relative to the first magnetic circuit direction 100A. For efficiently adjusting the cogging torque, the angle may preferably be as small as possible. One specific angle, ±10°, is shown in FIG. 3 (and also in the embodiment of FIG. 5) with the inner notches shown in phantom at ±10°.

By forming the inner notches 225A and 226A, the gap between the rotor 21 and the stator 22 is enlarged at the notches. Accordingly, the magnetic reluctance of the first magnetic circuit 100 originally having smaller magnetic reluctance than the second magnetic circuit 101 can be increased, thus reducing cogging torque applied to the rotor 21.

According to the present embodiment, since the inner notches 225A and 226A are formed, among the first magnetic circuit 100 and the second magnetic circuit 101, along the magnetic flux direction 100A of the first magnetic circuit 100 (the first magnetic circuit direction) originally having smaller magnetic reluctance at the rotation center of the rotor 21, the cogging torque applied to the rotor 21 can be effectively reduced.

Accordingly, although the unbalance amount of the oscillating weight 25 decreases in accordance with size reduction of the small-size power generator 20, since the cogging torque applied to the rotor 21 can also be reduced, the rotation startability of the rotor 21 can be improved, so that the rotor 21 can be rotated by a slight arm movement, thus enabling an efficient power generating system.

Further, the reduction of the cogging torque can be adjusted by the position, size and configuration of the inner notches 225A and 226A for adjusting the cogging torque. Accordingly, even when the size and weight of the oscillating weight 25 are reduced for minimizing the thickness of the index electronic clock 1, power can be efficiently generated by the small-size power generator 20, thus efficiently charging the secondary power supply 30 only by forming the inner notches 225A and 226A of a number, position, size and configuration corresponding to size and weight reduction of the oscillating weight 25.

A second embodiment of the present invention will be described below with reference to FIGS. 5 and 6.

Incidentally, in the following embodiment and modifications, the same reference numerals as in the first embodiment will be assigned to the same or similar components to simplify or omit description thereof.

Figure 5:
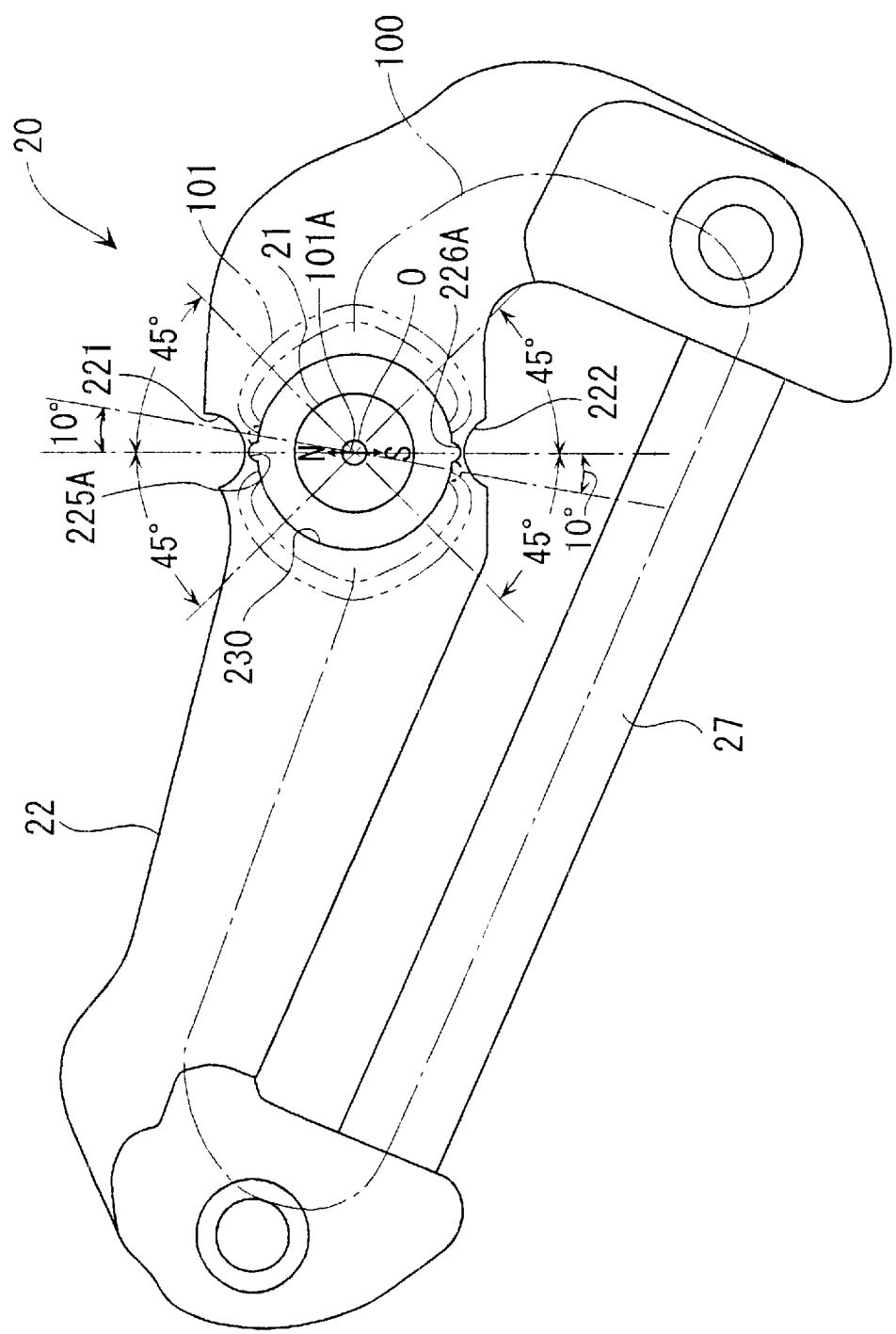
FIG. 5 is a plan view showing a primary portion of a power generator according to a second embodiment of the present invention.

In the present embodiment, material, area and gap dimension of the connecting portion of the respective stators 22 and the magnetic core 27 are arranged so that, when the inner notches 225A and 226A are not formed, the magnetic reluctance of the second magnetic circuit 101 (having magnetic flux closing at the stator 22 adjacent to the rotor 21 shown in double dotted line in FIG. 5) is smaller than magnetic reluctance of the first magnetic circuit 100 (extending from the stator 22, through the magnetic core 27 and back to the stator 22 shown in single dotted line).

Accordingly, the magnetic poles N and S of the permanent magnet of the rotor 21 are applied with the cogging torque in a direction that rests the magnetic poles N and S in a direction of the second magnetic circuit (direction shown in an arrow 101A in FIG. 5, i.e. orthogonal to the first magnetic circuit direction 100A).Thus, the cogging torque attracts the magnetic poles N and S in a direction connecting the outer notches 221 and 222. The resting position for the rotor 21 caused by the cogging torque is the no-load rotor stop position in the present embodiment.

In the present embodiment, in order to reduce the cogging torque, inner notches 225A and 226A for adjusting cogging torque are dented on an inner periphery of the rotor accommodation hole 230. Specifically, the inner notches 225A and 226A are arranged so that a direction extending from the rotation center O of the rotor 21 to the inner notches 225A and 226A is within angular range of ±45° around the arrow 101A direction (the second magnetic circuit direction), more specifically, precisely in the second magnetic circuit direction. Incidentally, a variation within angular range of approximately ±5° can be caused on account of production error etc.

Figure 6A:
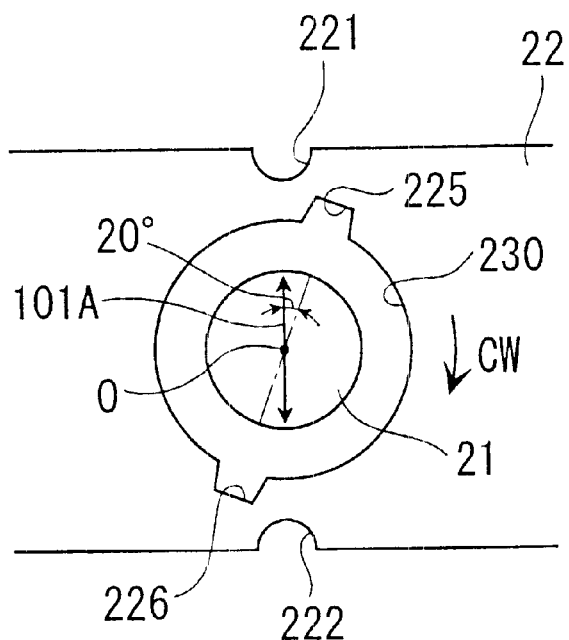
FIGS. 6A and 6b are illustrations showing an example of an arrangement of an inner notch of the power generator shown in FIG. 5.

Though the respective inner notches 225A and 226A are preferably formed along the second magnetic circuit direction 101A as shown in FIG. 5 in an ordinary case, the first inner notch 225A for adjusting cogging torque may be shifted clockwise relative to the second magnetic circuit direction 100A by a predetermined angle (e.g. 20°), and the second inner notch 226A for adjusting cogging torque may be formed at a position shifted from the first inner notch 225A by 180° as shown in FIG. 6A.

Figure 6B:
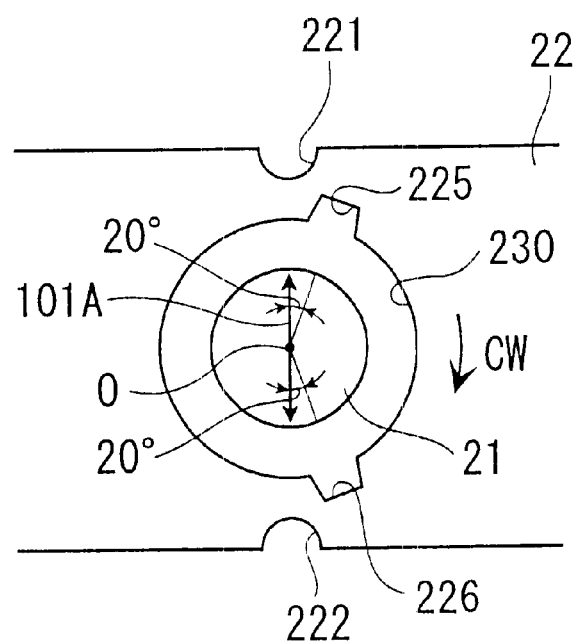

Alternatively, as shown in FIG. 6B, the first inner notch 226A for adjusting cogging torque may be shifted clockwise (in a CW direction) relative to the second magnetic circuit direction 101A by a predetermined angle (e.g. 20°), and the second inner notch 225A for adjusting cogging torque may be formed at a position shifted clockwise from the first inner notch 226A by a predetermined angle (e.g. 140°).

By forming the inner notches 225A and 226A, the gap between the rotor 21 and the stator 22 is enlarged at the notches. Accordingly, the magnetic reluctance of the second magnetic circuit 101 originally having smaller magnetic reluctance than the first magnetic circuit 100 can be increased, thus reducing cogging torque applied to the rotor 21.

According to the present embodiment, the same functions and effects as in the first embodiment can be obtained.

Incidentally, the scope of the present invention is not restricted to the above respective embodiments, but includes other arrangements as long as an object of the present invention can be attained. Modifications include the following.

For instance, the configuration of the inner notches 225A and 226A for adjusting cogging torque is not restricted to semi-spherical, but may be trapezoid as shown in FIGS. 6A and B or, alternatively, approximate triangle, square, and other polygon shapes. Incidentally, by forming the inner notch in a trapezoid or square as shown in FIGS. 6A and B, since the notch has a constant depth for a certain angle, position shift of the notch does not exert much influence on the cogging torque even when the position of the inner notch at the stator 22 is slightly shifted, so that the cogging torque can be stably adjusted.

Figure 7:
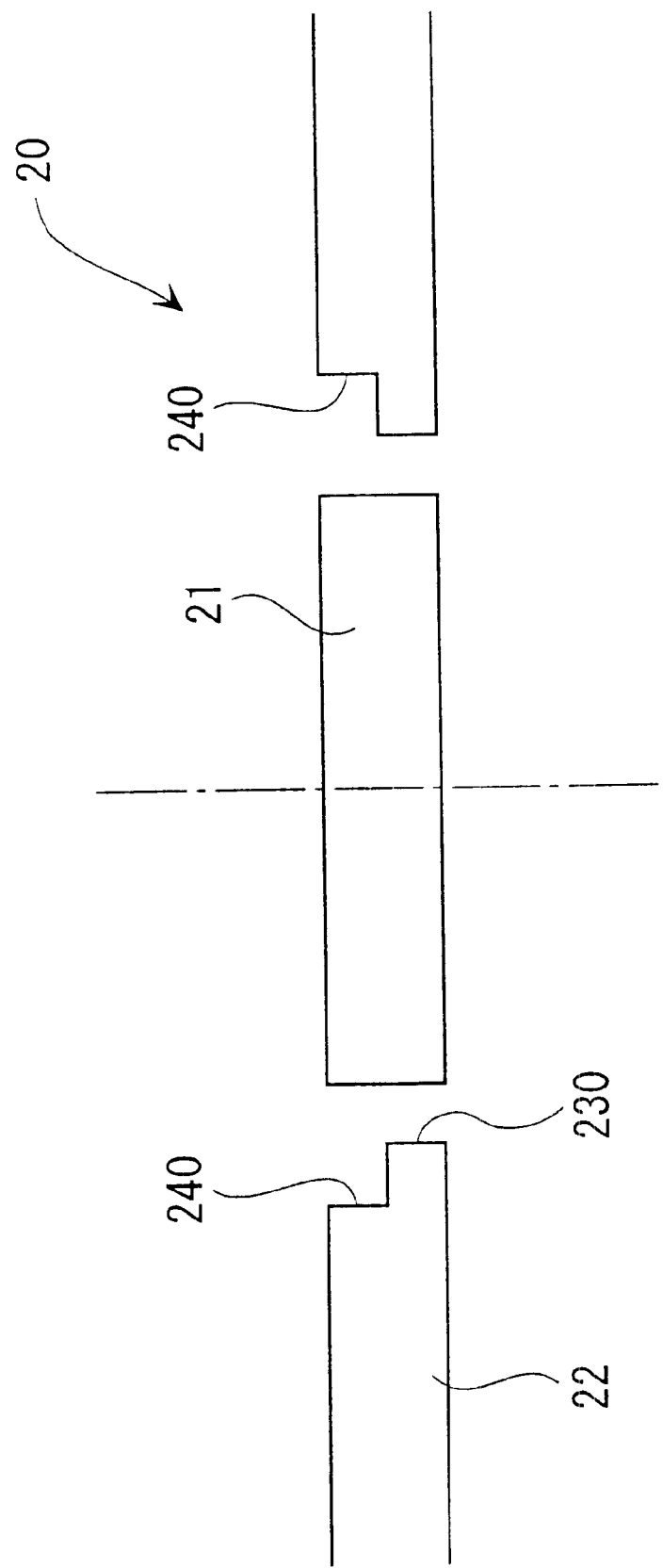
FIG. 7 is a cross section showing a modification of the inner notch according to the present invention.
Figure 8:
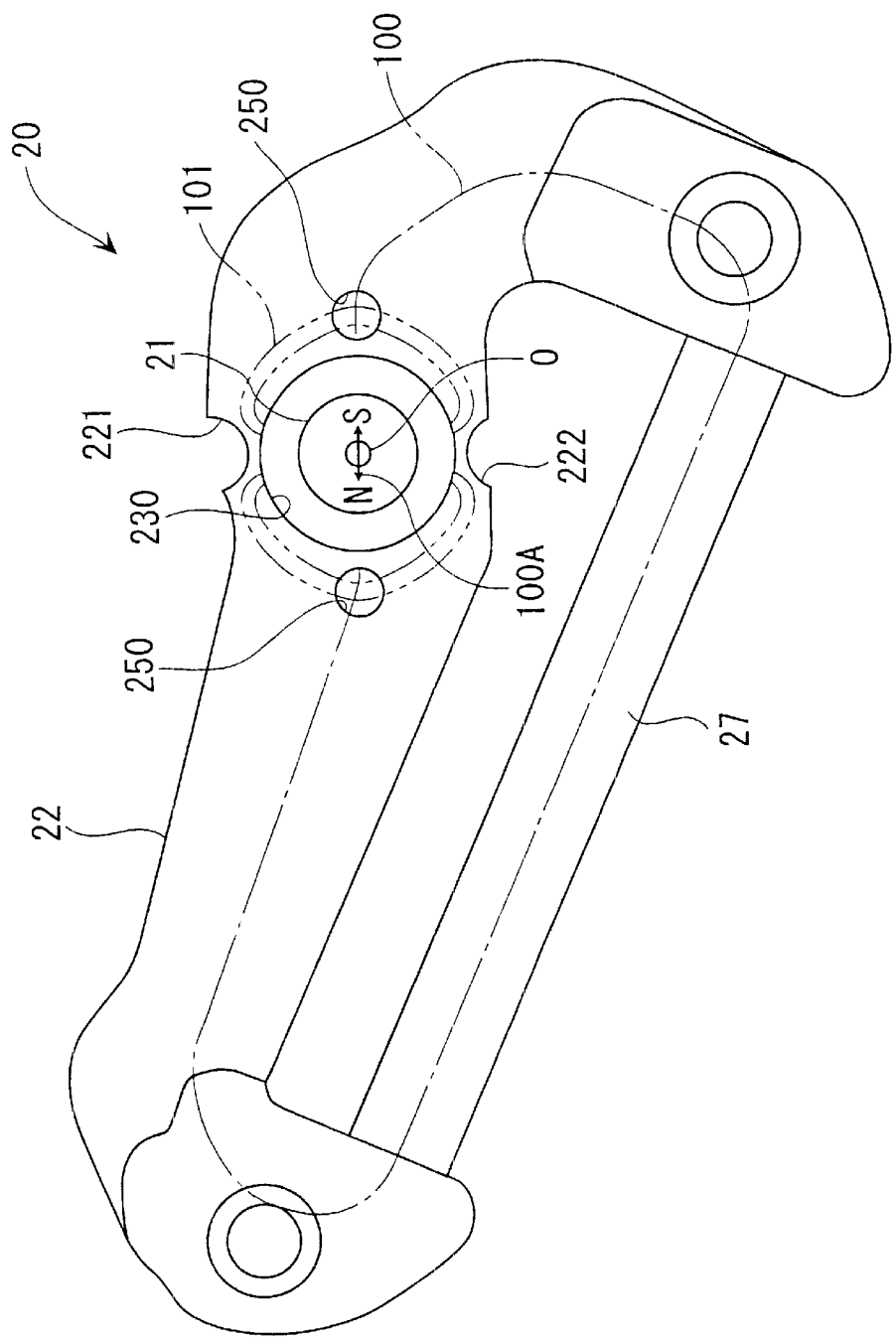
FIG. 8 is an illustration showing another modification of the inner notch according to the present invention.

Further, the inner notch may be formed by reducing the thickness of the stator 22 by forming a dent 240 on a part of the inner periphery of the rotor accommodation hole 230 as shown in FIG. 7. Alternatively, as shown in FIG. 8, the inner notch may be provided as a hole 250 penetrating the stator 22 in a thickness direction adjacent to the inner periphery of the rotor accommodation hole 230. In other words, any configuration is possible for the inner notch as long as the gap between the rotor 21 and the inner periphery of the rotor accommodation hole 230 can be partially enlarged or the magnetic reluctance of the magnetic circuits 100 and 101 can be adjusted by providing a through-hole in the magnetic circuit.

Figure 9:
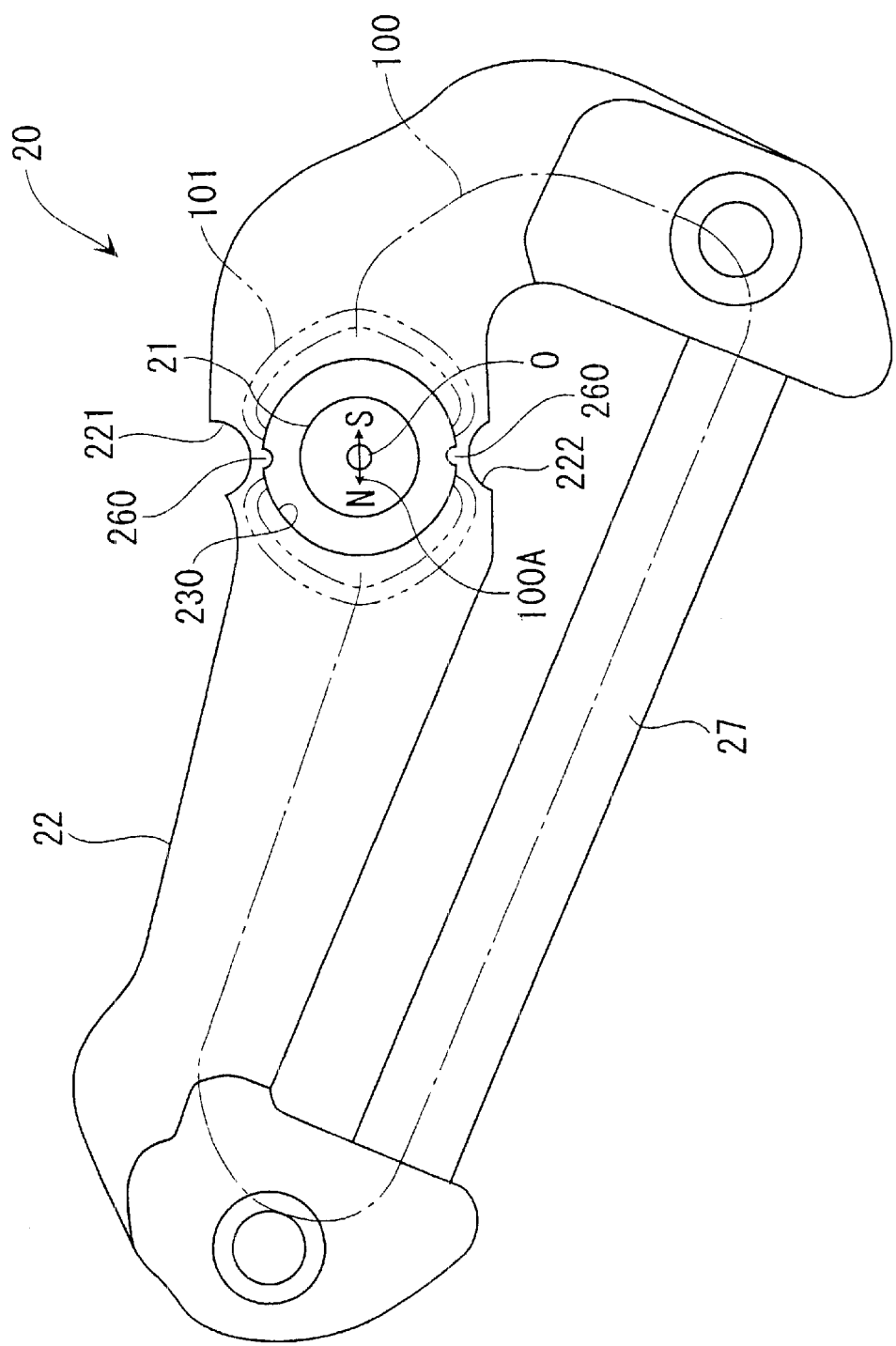
FIG. 9 is a plan view showing a further modification of the present invention having a projection.

Further, in the present invention, the magnetic reluctance of the respective magnetic circuits 100 and 101 may not be balanced by forming the inner notches as in the above respective embodiments, but a protrusion 260 as shown in FIG. 9 may be formed to balance the magnetic reluctance. Specifically, the magnetic reluctance of the respective magnetic circuits 100 and 101 can be adjusted by altering the gap dimension between the rotor 21 and the stator 22. Accordingly, instead of balancing the magnetic reluctance by forming the inner notches in a direction of the magnetic circuits having smaller magnetic reluctance to increase magnetic reluctance relative to the other circuit, the protrusion 260 may be formed in a direction of the magnetic circuit having the greater magnetic reluctance to reduce magnetic reluctance relative to the other circuit, thus adjusting balance of magnetic reluctance. In other words, formation of the protrusion 260 in a direction of the magnetic circuit having the greater magnetic reluctance has the same effect as forming the inner notch in a direction of the magnetic circuit having the smaller magnetic reluctance in that the difference between magnetic reluctances of the respective magnetic circuits can be reduced for balance adjustment. Accordingly, the same functions and effects as the aforesaid embodiments can be obtained by forming the protrusion 260.

Further, though the stator 22 of the aforesaid embodiment is an integral type, a two-piece stator composed of two stator materials disposed to sandwich the rotor 21 may be used. The inner notch may be formed in either the first magnetic circuit 100 or the second magnetic circuit 101, whichever has the smaller magnetic reluctance, in this arrangement too.

Further, though the above embodiments relate to a self-winding type timepiece where the rotor 21 is rotated by the oscillating weight 25, the present invention may be applied to a manual-winding type for manually rotating the rotor 21 by a crown etc. When the cogging torque applied to the rotor 21 is reduced in the manual-winding type, power can be efficiently generated with a small crown.

Further, the rotor 21 may be rotated by transmitting mechanical energy from a mechanical energy source (such as a power spring, rubber, spring and eccentric weight) through a mechanical energy transmission device, such as a gear train (gear wheel), friction gear, belt and pulley, chain and sprocket gear, rack and pinion, and cam.

The number, position within a predetermined range, size and configuration of the inner notch should be appropriately set in accordance with required adjustment of the cogging torque. Accordingly, a single inner notch may be formed in the present invention.

The position of the inner notch is varied in accordance with the magnitude of the respective magnetic reluctance of the first magnetic circuit 100 and the second magnetic circuit 101. However, the magnetic reluctance ordinarily differs according to the design of the small-size power generator 20 and is common to the power generator 20 of the same design. Accordingly, the position of the inner notch may be tested and set during design or sample production process, and the inner notch may be formed at the same position as long as the same small-size power generator 20 is manufactured.

Further, the timepiece of the present invention is not restricted to a wristwatch, but may be various timepieces such as table clock and wall clock. Alternatively, the timepiece of the present invention may have other functions such as cellular phone, pager, calculator, portable personal computer, and portable radio, in addition to providing a clock function.

The power generator according to the present invention is not restricted to be applied to the timepiece, but may be applied to various electronic devices such as portable sphygmomanometer, portable cellular phone, PHS, pager, pedometer, calculator, personal computer such as notebook computer, personal organizer, PDA (Personal Digital Assistant), portable radio, toys, IC card, and automobile and house key. In other words, the present invention can be widely applied to any electronic device consuming electric power. Since the cogging torque applied to the rotor 21 can be reduced, so that the size of the oscillating weight 21 and the power spring can be also reduced and a very small-size power generator can be produced, the present invention can be suitably applied to various portable electronic devices having a small size. Though a dry battery and charger are conventionally used for such portable electronic devices, installation of the power generator according to the present invention enables an electronic circuit and a processor to work as a drive system in the electronic devices without a battery, so that exchanging the battery is not required and environmental pollution can be prevented. Further, since power can be manually generated by installing the oscillating weight and power spring, a charger is not necessary, so that the electronic device can be actuated even in case of disaster, or outdoors or out of the home.

Next, experiments conducted for exemplifying an effect of the present invention will be described below.

In the present experiments, a power generator 20 according to the first and the second embodiments were used to confirm a change in cogging torque according to the presence of inner notch 225A and 226A by three-dimensional analysis based on a finite element method.

Incidentally, a disk-shaped samarium-cobalt sintered magnet having maximum energy products of 32MGOe (254.7 KJ/m$^3$ in International System of Units) and with 1.8 mm diameter and 0.4 mm thickness was used as the rotor 21. A permalloy material (PC material) with maximum permeability 400000 and saturation flux density of 0.74 T was used for the stator 22 and another permalloy material (PB material) with maximum permeability 50000 and saturation flux density of 1.5 T was used for the magnetic core 27.

Incidentally, for simultaneously testing the influence of the gap of the connecting portion of the stator 22 and the magnetic core 27, a change in cogging torque with and without 10 μm gap at the connecting portion was also analyzed.

Figure 10:
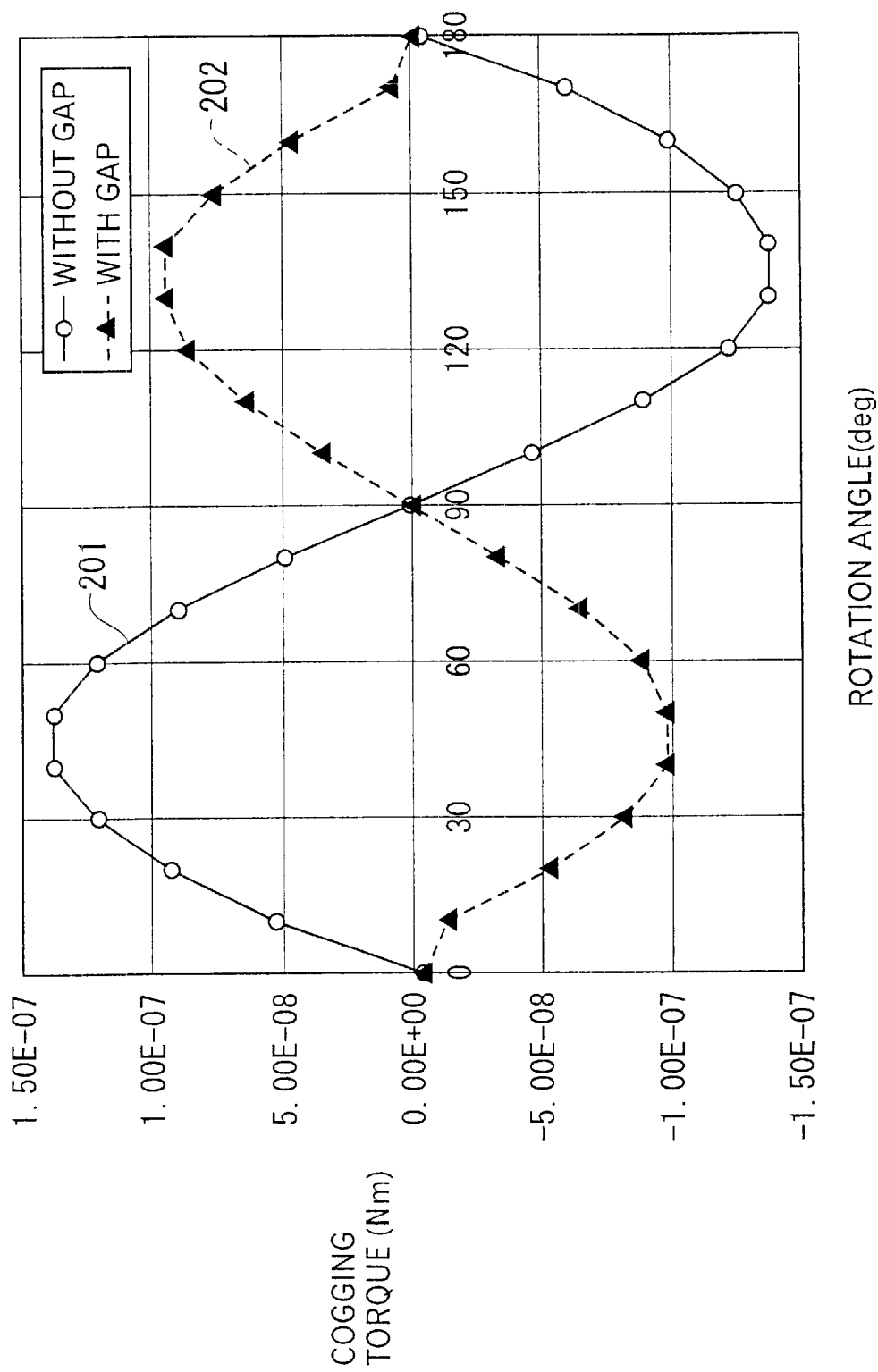
FIG. 10 is a graph showing a relationship between a rotary angle of the rotor and cogging torque according to an experiment of the present invention.
Figure 11:
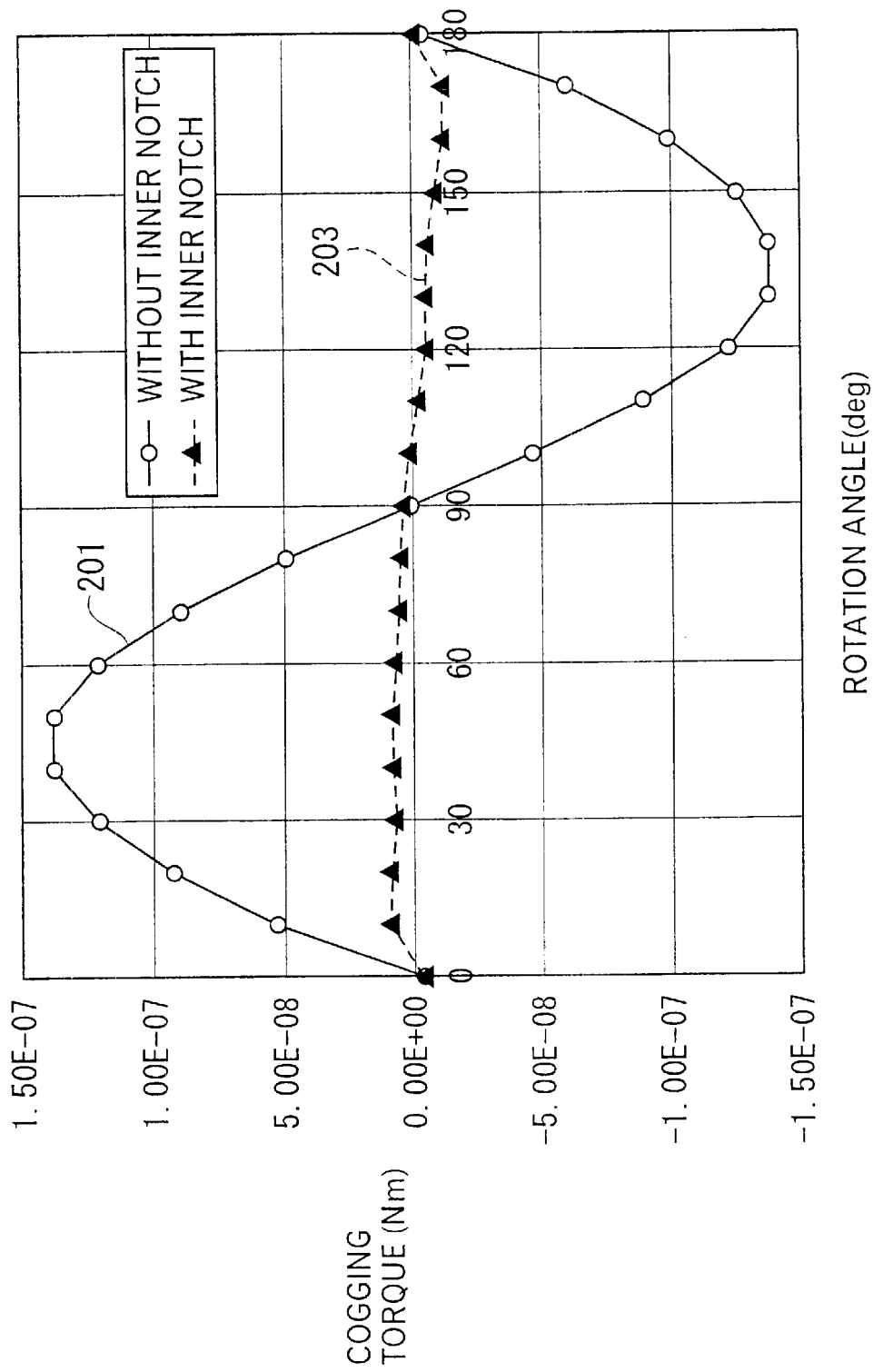
FIG. 11 is a graph showing a relationship between a rotary angle of the rotor and cogging torque according to an experiment of the present invention.
Figure 12:
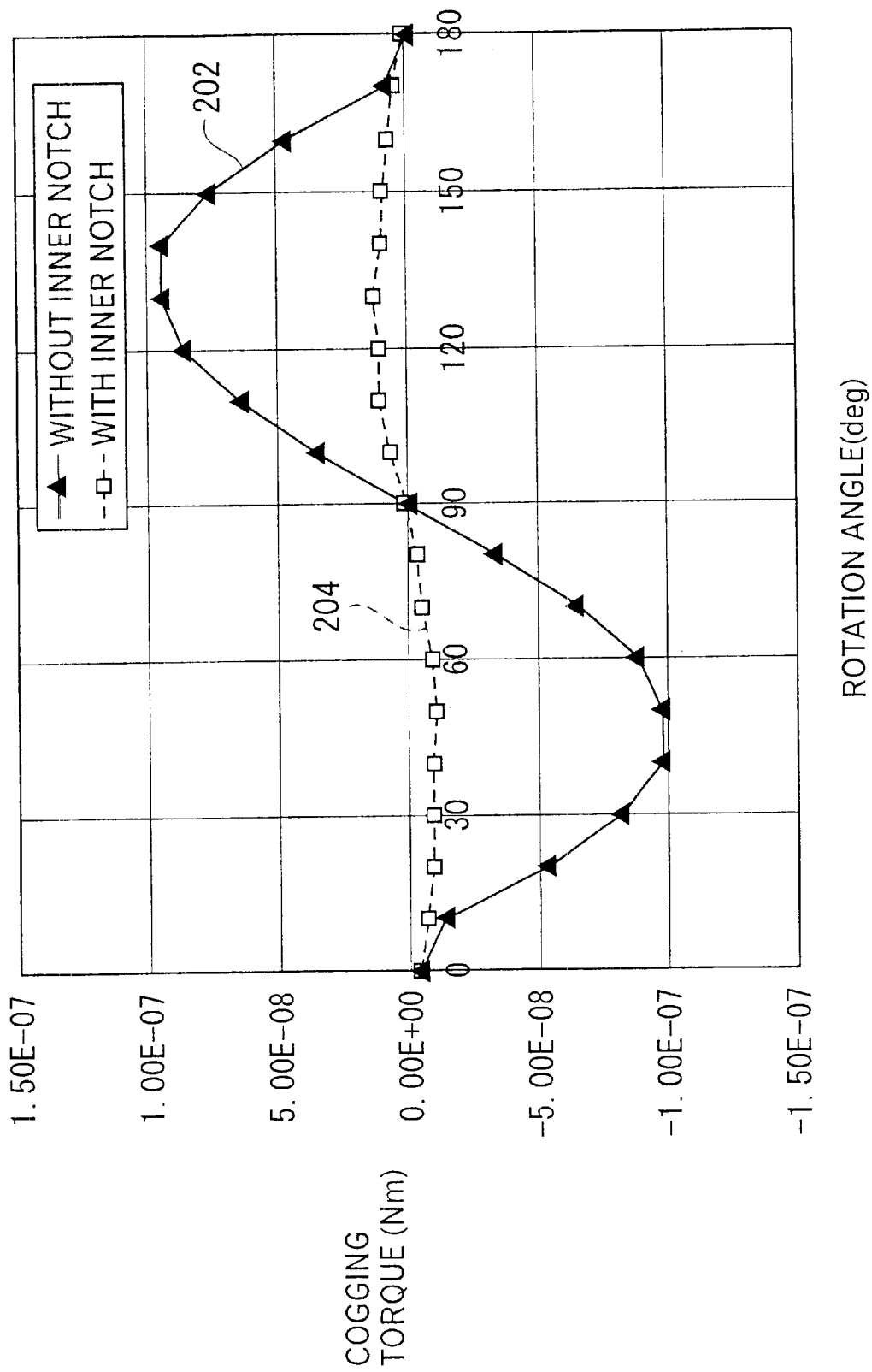
FIG. 12 is a graph showing a relationship between a rotary angle of the rotor and cogging torque according to an experiment of the present invention.

Graphs in FIGS. 10 to 12 show the analysis result under the above conditions. Incidentally, the rotation angle was set as 0 deg when the magnetic pole of the magnet (rotor 21) was oriented to the outer notch direction (a direction orthogonal to the main magnetic circuit). Data 201 shown in FIG. 10 represents a cogging torque without a gap at the connecting portion of the stator 22 and the magnetic core 27 without forming the inner notch. Data 202 represents a cogging torque with 10 μm gap at the connecting portion of the stator 22 and the magnetic core 27 without forming the inner notch.

As shown in FIG. 10, since the no-load rotor stop position of the magnet (rotor 21) is a point where the cogging torque changes between a positive value and a negative value, the no-load rotor stop position was a position with rotation angle 90°, i.e. in a direction orthogonal to the outer notch direction (the first magnetic circuit direction 100A) in the data 201 as in the aforesaid first embodiment.

On the other hand, the no-load stop position in the data 202 was a position with rotation angle 180°, i.e. along the outer notch direction (the second magnetic circuit direction 101A) as in the second embodiment. In other words, it was known that the no-load rotor stop position was shifted by 90° due only to the presence of the gap of the connecting portion of the stator 22 and the magnetic core 27 even if the material and configuration of the stator 22 and the magnetic core 27 was the same.

Further, data 203 shown in FIG. 11 represents a cogging torque when the inner notches 225A and 226A of 200 μm diameter were formed in the first magnetic circuit direction 100A and having no gap at the connecting portion of the stator 22 and the magnetic core 27 as shown in FIG. 3.

Data 204 shown in FIG. 12 represents a cogging torque when the inner notches 225A and 226A of 200 μm diameter were formed in the second magnetic circuit direction 101A and having 10 μm gap at the connecting portion of the stator 22 and the magnetic core 27 as shown in FIG. 5.

As clearly shown in FIG. 11, when the no-load rotor stop position was in the first magnetic circuit direction (data 201), in other words, when the magnetic reluctance of the first magnetic circuit 100 was smaller than the magnetic reluctance of the second magnetic circuit 101, the cogging torque could be largely reduced by forming the inner notches 225A and 226A in the first magnetic circuit direction 100A in the rotor accommodation hole 230. For instance, though the peak value of the cogging torque without forming the inner notch shown in data 201 was 1.4*10$^{-7}$ (Nm), the peak value of the cogging torque shown in data 203 when the inner notches 225A and 226A were formed was 1.0*10$^{-8}$ (N m), which was less than one fourteenth of the peak value without the inner notch.

Similarly, as shown in FIG. 12, when the second magnetic circuit direction was, the no-load rotor stop position (data 204), in other words, when the magnetic reluctance of the second magnetic circuit 101 was smaller than the magnetic reluctance of the first magnetic circuit 100, the cogging torque could be largely decreased by forming the inner notches 225A and 226A in the second magnetic circuit direction 101A in the rotor accommodation hole 230.

Accordingly, by forming the inner notch along the direction for the magnetic circuit having the smaller magnetic reluctance to pass the rotor accommodation hole 230, in other words, by forming the inner notch in the inner periphery of the rotor accommodation hole within an angular range of ±45° around the direction for the magnetic circuit having smaller magnetic reluctance to pass the rotation center of the rotor, the cogging torque applied to the rotor could be effectively reduced, thus confirming the effectiveness of the present invention.

Figure 13:
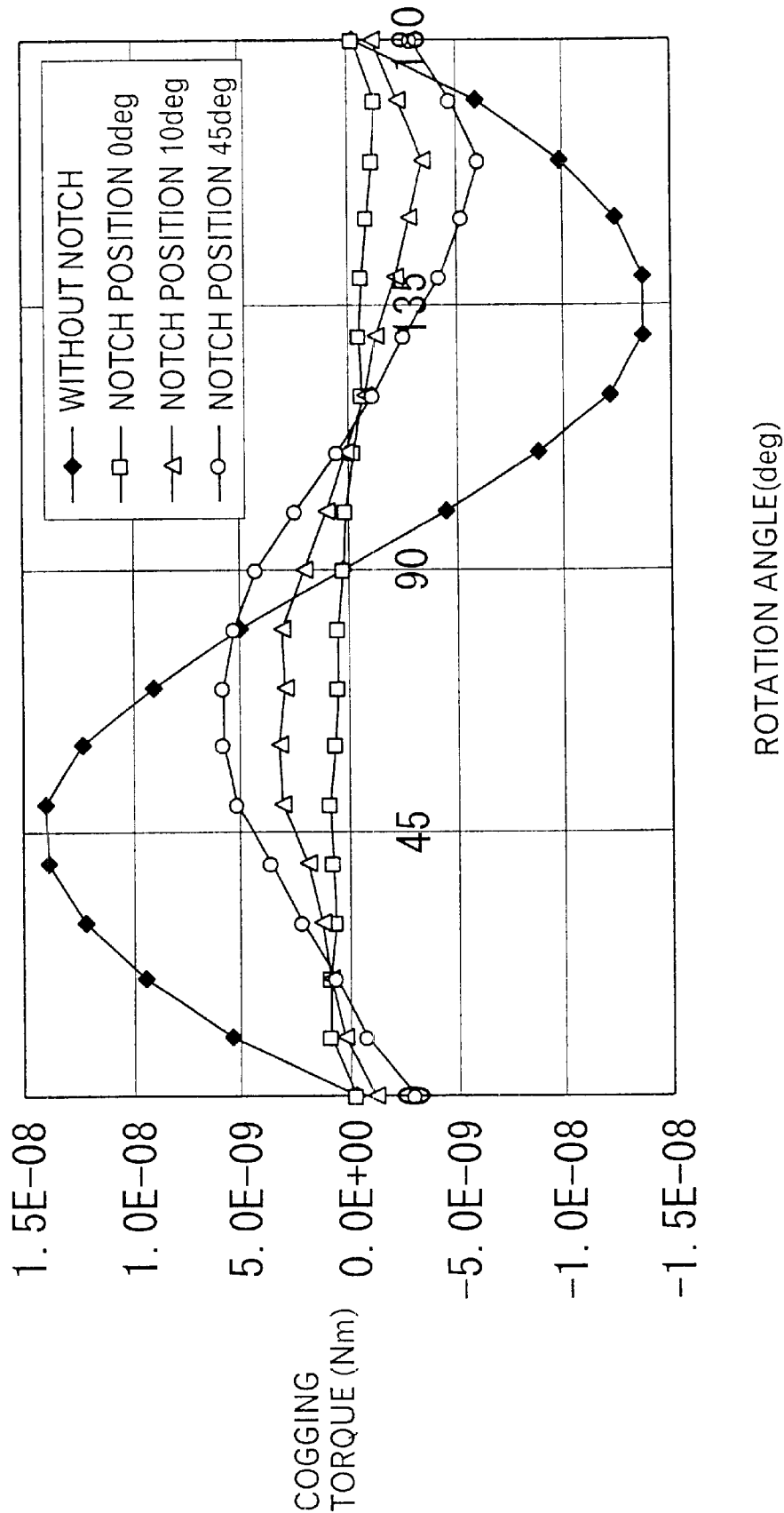
FIG. 13 is a graph showing a relationship between a preset angle of the inner notch and cogging torque according to an experiment of the present invention.
Figure 14:
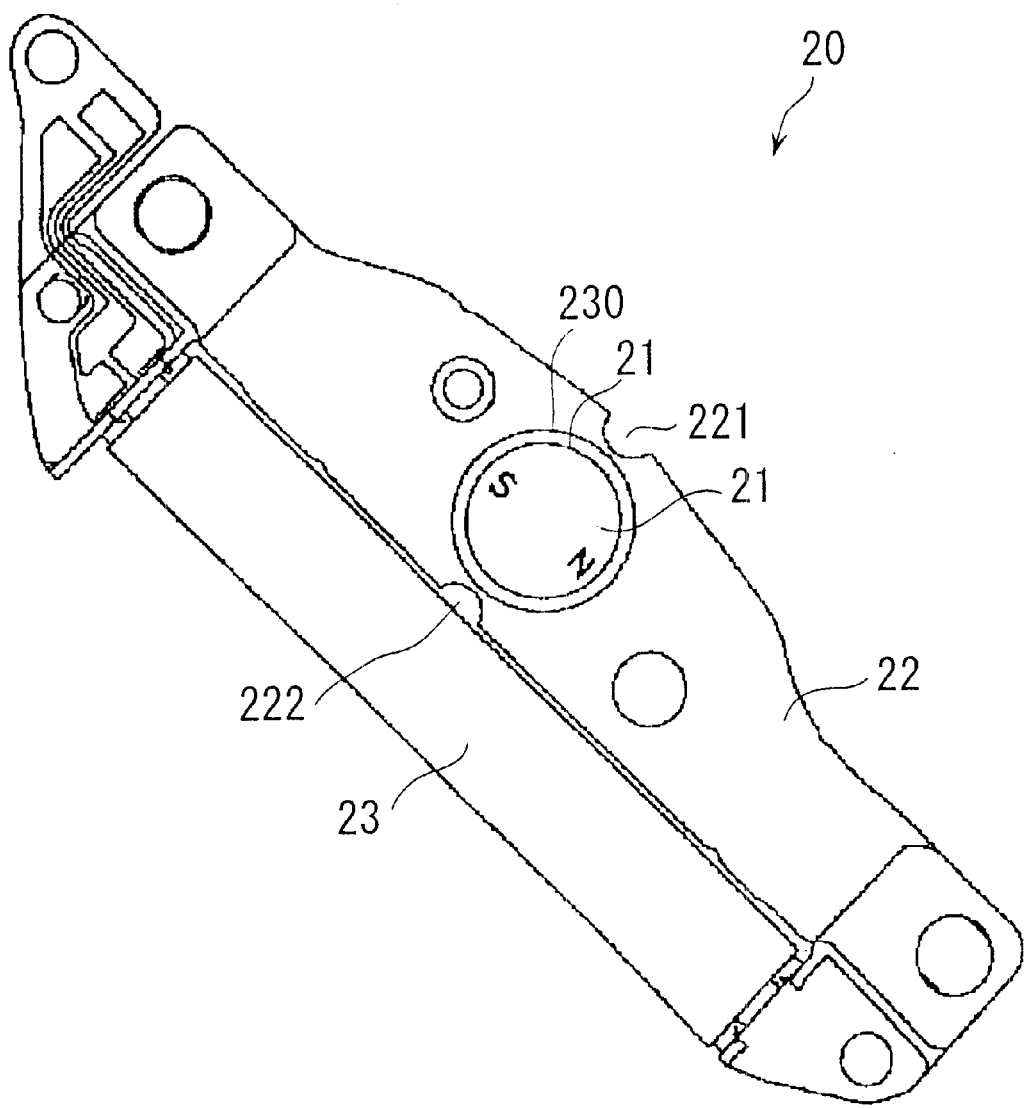
FIG. 14 is a plan view showing a conventional small-size power generator.

Further, the cogging torque was measured respectively for the position of the inner notch shifted by ±45°, ±10° and ±0° (in the magnetic circuit direction) from either the first magnetic circuit direction or the second magnetic circuit direction under the same conditions as the experiments shown in FIGS. 10 to 12. As a result, the cogging torque was the most reduced when the inner notch was disposed in ±0° arrangement (in the magnetic circuit direction) as shown in FIG. 13. When the inner notch was disposed in ±10° arrangement, high reduction effect of the cogging torque next to ±0° was observed. On the other hand, in the ±45° disposition, the cogging torque was reduced to approximately 40% as compared to an arrangement without the inner notch. As shown above, the notch for adjusting magnetic reluctance could be effectively disposed within the ±45° angular range, and high reduction effect could be obtained in the ±10° disposition.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A power generator comprising:
   a rotor having a permanent magnet rotated by a transmitted rotary drive force;
   a stator having a rotor accommodation hole, the rotor being disposed in the accommodation hole;

a magnetic core, and a power-generating coil wound around the magnetic core, the magnetic core, stator and rotor constituting a first magnetic circuit, and a part of the stator around and adjacent to the rotor constituting a second magnetic circuit; and further comprising an inner notch formed on the inner periphery of the rotor accommodation hole of the stator within an angular range of ±10° around a magnetic flux direction of the first magnetic circuit at a rotation center of the rotor.

2. The power generator according to claim 1, wherein the inner notch is formed in the magnetic flux direction of the first magnetic circuit at the rotation center of the rotor.

3. The power generator according to claim 1, further comprising an oscillating weight, and a power-generating gear train that provides said transmitted rotary drive force to the rotor by transmitting a rotation of the oscillating weight.

4. A timepiece comprising:
a power generator comprising:
a rotor having a permanent magnet rotated by a transmitted rotary drive force;
a stator having a rotor accommodation hole, the rotor being disposed in the accommodation hole;
a magnetic core, and a power-generating coil wound around the magnetic core, the magnetic core, stator and rotor constituting a first magnetic circuit, and a part of the stator around and adjacent to the rotor constituting a second magnetic circuit; and
further comprising an inner notch formed on the inner periphery of the rotor accommodation hole of the stator within an angular range of ±10° around a magnetic flux direction of the first magnetic circuit at a rotation center of the rotor;
a time display; and
a processor for actuating said time display by an electric energy generated by the power generator.

5. An electronic device comprising:
a power generator comprising:
a rotor having a permanent magnet rotated by a transmitted rotary drive force;
a stator having a rotor accommodation hole, the rotor being disposed in the accommodation hole;
a magnetic core, and a power-generating coil wound around the magnetic core, the magnetic core, stator and rotor constituting a first magnetic circuit, and a part of the stator around and adjacent to the rotor constituting a second magnetic circuit; and
further comprising an inner notch formed on the inner periphery of the rotor accommodation hole of the stator within an angular range of ±10° around a magnetic flux direction of the first magnetic circuit at a rotation center of the rotor; and
a processor actuated by an electric energy generated by the power generator.

6. A power generator comprising:
a rotor having a permanent magnet rotated by a transmitted rotary drive force;
a stator having a rotor accommodation hole, the rotor being disposed in the accommodation hole;
a magnetic core, and a power-generating coil wound around the magnetic core, the magnetic core, stator and rotor constituting a first magnetic circuit, and a part of the stator around and adjacent to the rotor constituting a second magnetic circuit; and
further comprising an inner notch formed on the inner periphery of the rotor accommodation hole of the stator within an angular range of ±10° around a magnetic flux direction of the second magnetic circuit at a rotation center of the rotor.

7. The power generator according to claim 6, wherein the inner notch is formed in the magnetic flux direction of the second magnetic circuit at the rotation center of the rotor.

8. The power generator according to claim 6, further comprising an oscillating weight, and a power-generating gear train that provides said transmitted rotary drive force to the rotor by transmitting a rotation of the oscillating weight.

9. A timepiece comprising:
a power generator comprising:
a rotor having a permanent magnet rotated by a transmitted rotary drive force;
a stator having a rotor accommodation hole, the rotor being disposed in the accommodation hole;
a magnetic core, and a power-generating coil wound around the magnetic core, the magnetic core, stator and rotor constituting a first magnetic circuit, and a part of the stator around and adjacent to the rotor constituting a second magnetic circuit; and
further comprising an inner notch formed on the inner periphery of the rotor accommodation hole of the stator within an angular range of ±10° around a magnetic flux direction of the second magnetic circuit at a rotation center of the rotor;
a time display; and
a processor for actuating said time display by an electric energy generated by the power generator.

10. An electronic device comprising:
a power generator comprising:
a rotor having a permanent magnet rotated by a transmitted rotary drive force;
a stator having a rotor accommodation hole, the rotor being disposed in the accommodation hole;
a magnetic core, and a power-generating coil wound around the magnetic core, the magnetic core, stator and rotor constituting a first magnetic circuit, and a part of the stator around and adjacent to the rotor constituting a second magnetic circuit; and
further comprising an inner notch formed on the inner periphery of the rotor accommodation hole of the stator within an angular range of ±10° around a magnetic flux direction of the second magnetic circuit at a rotation center of the rotor; and
a processor actuated by an electric energy generated by the power generator.

* * * * *